Aug. 19, 1924.

J. H. DENNEDY 1,505,321

PACKING FOR SHAFTS

Filed Sept. 10, 1921

Inventor
JAMES H. DENNEDY
By
Charles E. Wiley
Attorney

Patented Aug. 19, 1924.

1,505,321

UNITED STATES PATENT OFFICE.

JAMES H. DENNEDY, OF DETROIT, MICHIGAN.

PACKING FOR SHAFTS.

Application filed September 10, 1921. Serial No. 499,805.

*To all whom it may concern:*

Be it known that I, JAMES H. DENNEDY, a citizen of the United States, residing at Detroit, county of Wayne, State of Michigan, have invented a certain new and useful Improvement in Packing for Shafts, and declare the following to be a full, clear, and exact description of the same, such as will enable others skilled in the art to which it pertains to make and use the same, reference being had to the accompanying drawings, which form a part of this specification.

This invention relates to packing for shafts and the object of the invention is to provide a device for preventing leakage of liquid or gas along a shaft. While this invention is applicable for use on practically all types of rotating shafts, it is particularly adapted for use on the shaft of compressors in refrigerating systems for preventing leakage of the refrigerant such as ammonia gas, sulphur dioxide or the like, the loss of which is very great where no provision is made to prevent such leakage. Another reason for preventing this leakage is that ammonia gas or sulphur dioxide when breathed in any quantity is injurious and should the leakage occur within the refrigerator the food therein is contaminated. This invention is also adapted for packing a shaft against leakage of lubricating oil or the ingress of air and will also prevent leakage of the refrigerant even when under considerable pressure. A further object of the invention is to provide a metallic packing which will remain tight under all conditions of temperature or pressure and which is so designed as to be easily assembled or removed. These objects and the several novel features of the invention are hereinafter fully described and claimed and the preferred form of construction of a packing by which these objects are attained is shown in the accompanying drawings in which—

Figure 1:
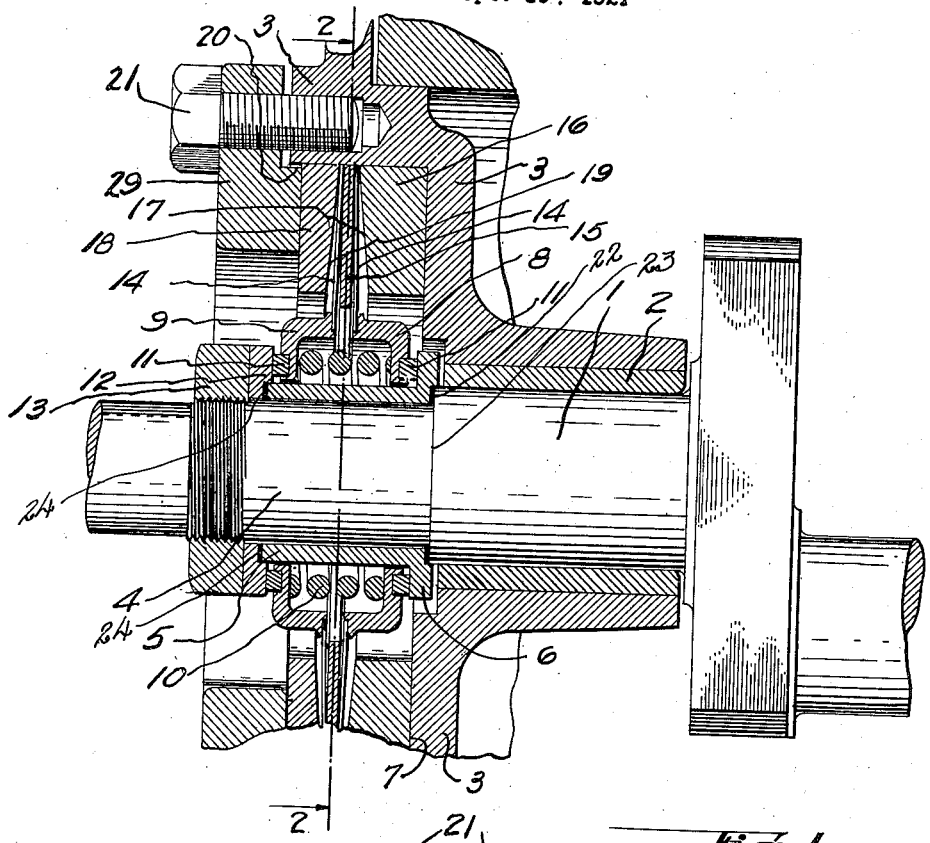
Fig. 1 is a section through the main bearing of a compressor showing my improved packing.
Figure 2:
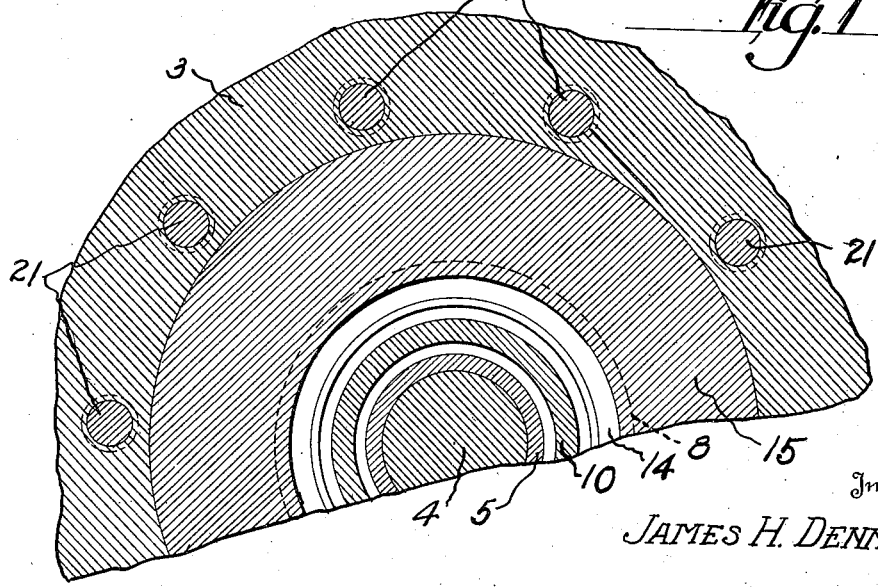
Fig. 2 is a section taken on line 2—2 of Fig. 1.

As shown in Fig. 1 a crank shaft 1 is provided to which the connecting rods of a compressor may be attached. The crank shaft is rotatably mounted in a bearing 2 which is provided in the crank case 3 of the compressor, the crank case being recessed as shown in Fig. 1 to receive the packing. The crank shaft is provided with a reduced portion 4 and a sleeve 5 is positioned thereon, the said sleeve being provided with an annular flange 6 at the end. A gasket 22 is provided between the shoulder 23 of the shaft and end of the sleeve 5 and a gasket 24 is provided about the portion 4 at the opposite end of the sleeve 5. The portion 4 of the crank shaft extends centrally through the annular recess 7 in the crank case 3 and, as will be noted from Fig. 1 the sleeve 5 also extends through this recess. A pair of members 8 and 9 are positioned over the sleeve 5, the said members being centrally apertured to receive the sleeve and allow clearance therefor and these members are spread apart by a coiled spring 10, which is also positioned over the sleeve 5 as shown in Fig. 1. Each of these members 8 and 9 carries a babbitt ring 11, the ring on the member 8 being adapted to pack the annular face of the flange 6 and the ring on the member 9 being adapted to pack the corresponding face of an annular member 12 which is positioned over the portion 4 of the shaft at the end of the sleeve 5 and is held in place by the nut 13 threaded on the shaft. When the nut 13 is turned up the gasket 24 is bindingly engaged between the member 12 and one end of the sleeve 5 and the gasket 22 is bindingly engaged between the opposite end of the sleeve 5 and the shoulder 23 thus preventing leakage between the sleeve and portion 4 of the shaft. A pair of centrally apertured metal discs or diaphragms 14 are provided, which about their central apertures are sweat into corresponding annular grooves in the members 8 and 9, the discs 14 fitting within the recess 7 at the periphery. A centrally apertured disc 15 is provided between the diaphragms 14 which fits within the recess 7 and acts as a spacer for the diaphragms. To support these diaphragms in position in the recess 7, I provide an annular member 16 having a beveled face 17 on the side toward the diaphragms and on the opposite side I provide member 18 having a beveled face 19 toward the diaphragms. Both of these members 16 and 18 fit closely within the recess 7 and when brought together are adapted to bind the diaphragms 14 and apertured disc 15 together at the periphery providing a leak proof joint. To bind the members 16 and 18 tightly together I provide a member 29 having an annular shoulder 20 adapted to fit within the recess. This member 29 is provided with a series of apertures to receive the bolts 21 which are threaded into the casing or housing 3 and by drawing up the bolts 21 the annular shoulder 20 is forced into the recess 7 which binds the members 16 and 18, diaphragms 14 and disc 15 between the bottom of the recess 7 and the annular shoulder 20. It can thus be seen that gas or liquid cannot escape from the periphery of the recess 7 nor between the portion 4 of the shaft and the sleeve 5 due to the gasket 22 and 24 and, as the shaft and sleeve are rotating, leakage of gas is prevented about the exterior of the sleeve 5 by the babbitt ring 11 which is held in tight engagement with the flange 6 of the sleeve by the spring 10. It will also be noted that during rotation of the shaft the nut 13 rotates therewith and due to the annular member 12 being bindingly secured in place by the nut 13 the said member 12 will rotate with the nut and shaft while the babbitt ring 11 and members 8 and 9 remain stationary. By this construction even if the gas passed the first ring 11 it is prevented from escaping by the second babbitt ring 11 on the member 9 and the gas is prevented from passing outwardly along the shaft by the gasket 24 and nut 13. As the babbitt rings wear the members 8 and 9 will be forced apart by the coiled spring 10 which always maintains the babbitt rings in tight engagement with the flange 6 and annular member 12 so that no leakage can occur. This device will also prevent leakage of gas even when under considerable pressure as the pressure would have to build up in the recess 7 sufficient to further compress the spring 10 before leakage could occur and should the pressure be sufficient to accomplish this, the member 9 would be forced outward with greater pressure which would build up between the members 8 and 9 and the diaphragms 14 thereby more tightly pack the babbitt ring 11 of the member 9 against the corresponding face of the annular member 12.

From the foregoing description it becomes evident that the device is very simple and efficient in operation, will not get out of order, is easily assembled or disassembled and provides a device which accomplishes the objects described.

Having thus fully described my invention, its utility and mode of operation, what I claim and desire to secure by Letters Patent of the United States is—

1. In a packing for shaft, in combination, a casing having a recess, a shaft extending centrally through the said recess, a pair of rings fitting within the recess and having companion tapered faces, a pair of centrally apertured diaphragms fitting within the recess and positioned between the tapered faces, a centrally apertured metal disc positioned between and spacing the diaphragm, a clamp member having an annular shoulder fitting within the recess, means for drawing the clamp member up to bind the rings diaphragms and disc between the bottom of the recess and the annular shoulder, an annular member secured to each disc at the central aperture, a packing ring carried by each annular member, a sleeve sealed to the shaft and having an annular flange, a ring at the end of the sleeve opposite the flange, a nut threaded on the shaft and supporting the ring in position and coiled spring about the sleeve forcing the annular members apart and causing the packing rings to engage the annular flange and ring.

2. In a packing for shafts, in combination, a casing having a recess, a shaft extending centrally through the said recess, a pair of rings fitting within the recess having companion tapered faces, a pair of centrally apertured diaphragms fitting within the recess and positioned between the tapered faces, an annular spacer between the peripheries of said diaphragms, a clamp member having an annular shoulder fitting within the recess, means for drawing the clamp member up to bind the rings, diaphragms, and disc between the bottom of the recess and the annular shoulder, an annular member secured to each diaphragm at the central aperture, a packing ring carried by each annular member, means sealed to the shaft against which the packing rings are adapted to engage, and a spring forcing the annular members toward said last mentioned means.

3. In a packing for shafts, in combination, a casing having a recess, a shaft extending therethrough, a pair of centrally apertured spring metal diaphragms within the recess, a pair of rings fitting the recess and positioned on opposite sides of the diaphragms and having tapered faces adjacent the respective diaphragms, a cupped ring secured to the periphery of each diaphragm at the center, the two cupped rings being in opposed relation and extending about the shaft, a packing ring on the exterior face of each cupped ring, and a coiled expanding spring between the cupped rings, there being a contact surface provided for engagement by each packing ring.

4. In a packing for shafts, in combination, a casing having a recess, a shaft extending centrally through the said recess, a pair of rings fitting within the recess having companion tapered faces, a pair of centrally apertured diaphragms fitting within the recess and positioned between the tapered faces, a centrally apertured metal disc positioned between and spacing the diaphragms, means for drawing the rings together to seal the diaphragms at the periphery, an annular member secured to each diaphragm at the central aperture, a packing ring carried by each annular member, means sealed to the shaft against which the packing rings are adapted to engage and a spring forcing the annular members apart.

5. As a packing for shafts, the combination of a casing, a shaft extending therethrough, a pair of centrally apertured diaphragm discs disposed around said shaft, an annular contact member secured to each of said discs at their inner margins, contact members on said shaft for engaging said contact members on said discs, spring means urging the respective engaging contact members together, annular clamping members on the opposed sides of said discs for clamping said discs together at their outer margins and a rigid circular plate clamped at its periphery between said discs and extending inwardly substantially to said contact members on said discs for spacing said discs and for limiting their flexure.

6. In a packing for shafts, in combination, a shaft, a casing having an aperture through which said shaft extends, a pair of clamping rings supported within said casing, having companion tapered faces, a pair of centrally apertured diaphragms positioned at their peripheries between said faces and sealed by said clamping rings to said casing, spacing means for the peripheries of said diaphragms, an annular member secured to each diaphragm at its central aperture, and means including a packing ring for effecting a rotary seal between each of said annular members and said shaft.

In testimony whereof, I sign this specification.

JAMES H. DENNEDY.